(12) United States Patent
Lim

(10) Patent No.: US 12,483,057 B2
(45) Date of Patent: Nov. 25, 2025

(54) ZERO-VOLTAGE DISCHARGE CIRCUIT DEVICE

(71) Applicant: APRO CO., LTD, Gunpo-si (KR)

(72) Inventor: Jong Hyun Lim, Gunpo-si (KR)

(73) Assignee: APRO CO., LTD, Gunpo-si (KR)

( * ) Notice: Subject to any disclaimer, the term of this patent is extended or adjusted under 35 U.S.C. 154(b) by 722 days.

(21) Appl. No.: 17/797,712

(22) PCT Filed: Mar. 9, 2020

(86) PCT No.: PCT/KR2020/003249
§ 371 (c)(1),
(2) Date: Aug. 4, 2022

(87) PCT Pub. No.: WO2021/182648
PCT Pub. Date: Sep. 16, 2021

(65) Prior Publication Data
US 2023/0101334 A1   Mar. 30, 2023

(30) Foreign Application Priority Data

Mar. 9, 2020 (KR) .................. 10-2020-0028766

(51) Int. Cl.
*H02J 7/00* (2006.01)
*H02J 7/34* (2006.01)

(52) U.S. Cl.
CPC ........ *H02J 7/007182* (2020.01); *H02J 7/345* (2013.01)

(58) Field of Classification Search
None
See application file for complete search history.

(56) References Cited

U.S. PATENT DOCUMENTS

| 2010/0301831 A1* | 12/2010 | Krause | H02M 7/797 |
| | | | 323/311 |
| 2015/0214847 A1 | 7/2015 | Shimada et al. | |

FOREIGN PATENT DOCUMENTS

| KR | 10-2011-0094634 A | 8/2011 |
| KR | 10-2012-0125768 A | 11/2012 |
| KR | 10-1197078 B1 | 11/2012 |
| KR | 10-2014-0145310 A | 12/2014 |
| KR | 10-2015-0042375 A | 4/2015 |

OTHER PUBLICATIONS

International Search Report for PCT/KR2020/003249 mailed Dec. 2, 2020 from Korean Intellectual Property Office.

* cited by examiner

*Primary Examiner* — Arun C Williams
(74) *Attorney, Agent, or Firm* — Revolution IP, PLLC

(57) ABSTRACT

Disclosed is a zero-voltage discharge circuit device, in particular, a zero-voltage discharge circuit device configured to discharge a secondary battery while relevant switching elements are kept continuously turned on without being repeatedly turned on and off in a discharge mode of the second battery, so that the discharge circuit can be configured with low withstand voltage switching elements, and is configured to generate a charging current and a discharging current by just selectively turning on the switching elements without changing an operating voltage, thereby reducing power loss in charging and discharging, and simplifying a control operation for the charging and the discharging.

1 Claim, 5 Drawing Sheets

ZERO-VOLTAGE DISCHARGE CIRCUIT DEVICE

TECHNICAL FIELD

The disclosure relates to a zero-voltage discharge circuit device, and, particularly, a zero-voltage discharge circuit device, which is configured to discharge a secondary battery while relevant switching elements are kept continuously turned on without being repeatedly turned on and off in a discharge mode of the second battery, so that the discharge circuit can be configured with low withstand voltage switching elements, and is configured to generate a charging current and a discharging current by just selectively turning on the switching elements without changing an operating voltage, thereby reducing power loss in charging and discharging, and simplifying a control operation for the charging and the discharging.

BACKGROUND ART

Zero-voltage discharge refers to that a battery operates in a constant current mode (CCM), where current has a constant level, until voltage reaches 0V while the battery is being discharged.

The zero-voltage discharge is necessary for the following reasons: a charger/discharger is classified into a charger/discharger for formation, which is used in the manufacture of a secondary battery product, and a charger/discharger for a cycler, which repeats charging and discharging more times to design and research the products, and it is important to implement a circuit for the zero-voltage discharge to meet the requirements of a user because the charger/discharger for the cycler uses a voltage of 0 to 4.5V and performs discharge up to a lower voltage.

In a conventional circuit, the zero-voltage discharge was not achieved. The reason is as follows: the load wiring of the charger/discharger is so long (about 6 to 10 m) that a voltage drop (about 0.7 to 1.0 V) occurs when current flows in the load wiring. In addition, a voltage drop also occurs when current flows in semiconductor elements (a diode, a metal oxide semiconductor field effect transistor (MOSFET), etc.) of the circuit. Due to voltage drop components described above, constant current discharge is not maintained in a region where a battery voltage is low. Therefore, the conventional charging/discharging circuit cannot maintain the constant current discharge when the battery voltage is lower than or equal to 2.0 V.

Such a conventional secondary battery charging/discharging circuit used for testing a secondary battery could make the secondary battery be discharged only up to a certain voltage (e.g., up to 20% of a rated voltage) or higher but be not discharged below that voltage. Therefore, there was a problem in that the secondary battery was not sufficiently tested.

To solve this problem of the conventional charging/discharging circuit, Korean Patent No. 10-1197078 (hereinafter referred to as the "related art") has disclosed a zero voltage discharge circuit with active switching elements, in which only a switching operation is enough to perform discharging without adding separate auxiliary power, thereby making a secondary battery sufficiently discharge a small amount of remaining voltage (20% or below to 0%).

However, the foregoing zero voltage discharge circuit suggested in the related art unavoidably increases the withstand voltage of relevant switching elements due to parasitic resonance because the switching elements repeatedly switch on and off under pulse width modulation (PWM) control during the charging or the discharging, and increases the costs of the circuit because high withstand voltage switching elements are used.

Further, the foregoing zero voltage discharge circuit suggested in the related art has a disadvantage in that control operations for charging and discharging are complicated because all the switching elements connected to the primary and secondary sides of a transformer are required to be selectively controlled to generate a charging current and a discharging current, and the voltage polarity at the secondary side of the transformer is required to be altered according to the charging and the discharging.

DISCLOSURE

Technical Problem

The disclosure is conceived to solve the problems of the related art, and an aspect of the disclosure is to provide a zero-voltage discharge circuit device, which is configured to discharge a secondary battery while relevant switching elements are kept continuously turned on without being repeatedly turned on and off in a discharge mode of the second battery, so that the discharge circuit can be configured with low withstand voltage switching elements, thereby reducing the costs of configuring the charging/discharging circuit.

Further, an aspect of the disclosure is to provide a zero-voltage discharge circuit device, which is configured to generate a charging current and a discharging current by just selectively turning on switching elements without changing an operating voltage, thereby reducing power loss in charging and discharging, and simplifying a control operation for the charging and the discharging.

Technical Solution

A zero-voltage discharge circuit device according to the disclosure, proposed to solve the foregoing problems, includes a first switching element including a first end connected to an operating voltage applying node corresponding to a node to which an operating voltage is applied by an operating voltage applying unit, and a second end connected to a first node; a second switching element including a first end connected to the operating voltage applying node, and a second end connected to a second node, and being connected in parallel with the first switching element; a third switching element including a first end connected to the first node, and a second end connected to a reference node; a fourth switching element including a first end connected to the second node, and a second end connected to the reference node; a first inductor including a first end connected to the first node, and a second end connected to a third node to which a positive (+) terminal of a secondary battery is connected; a first capacitor including a first end connected to the third node, and a second end connected to the reference node; a second inductor including a second end connected to the second node, and a first end connected to a fourth node to which a negative (−) terminal of a secondary battery is connected; and a second capacitor including a first end connected to the fourth node, and a second end connected to the reference node.

Here, only the first switching element and the fourth switching element are turned on in a charge mode for the secondary battery, and only the second switching element and the third switching element are turned on in a discharge mode for the secondary battery.

Further, the operating voltage applying unit equally applies the operating voltage to the operating voltage applying node in a charge mode and a discharge mode for the secondary battery.

Advantageous Effects

In a zero-voltage discharge circuit device with the foregoing problems and solutions according to the disclosure, a secondary battery is configured to be discharged while relevant switching elements are kept continuously turned on without being repeatedly turned on and off in a discharge mode of the second battery, so that the discharge circuit can be configured with low withstand voltage switching elements, thereby having an advantage of reducing the costs of configuring the charging/discharging circuit.

Further, according to the disclosure, it is configured to generate a charging current and a discharging current by just selectively turning on switching elements without changing an operating voltage, thereby having effects on reducing power loss in charging and discharging, and simplifying a control operation for the charging and the discharging.

BEST MODE

Below, embodiments of a zero-voltage discharge circuit device with the foregoing problems, solutions and effects according to the disclosure will be described with reference to the accompanying drawings.

Figure 1:
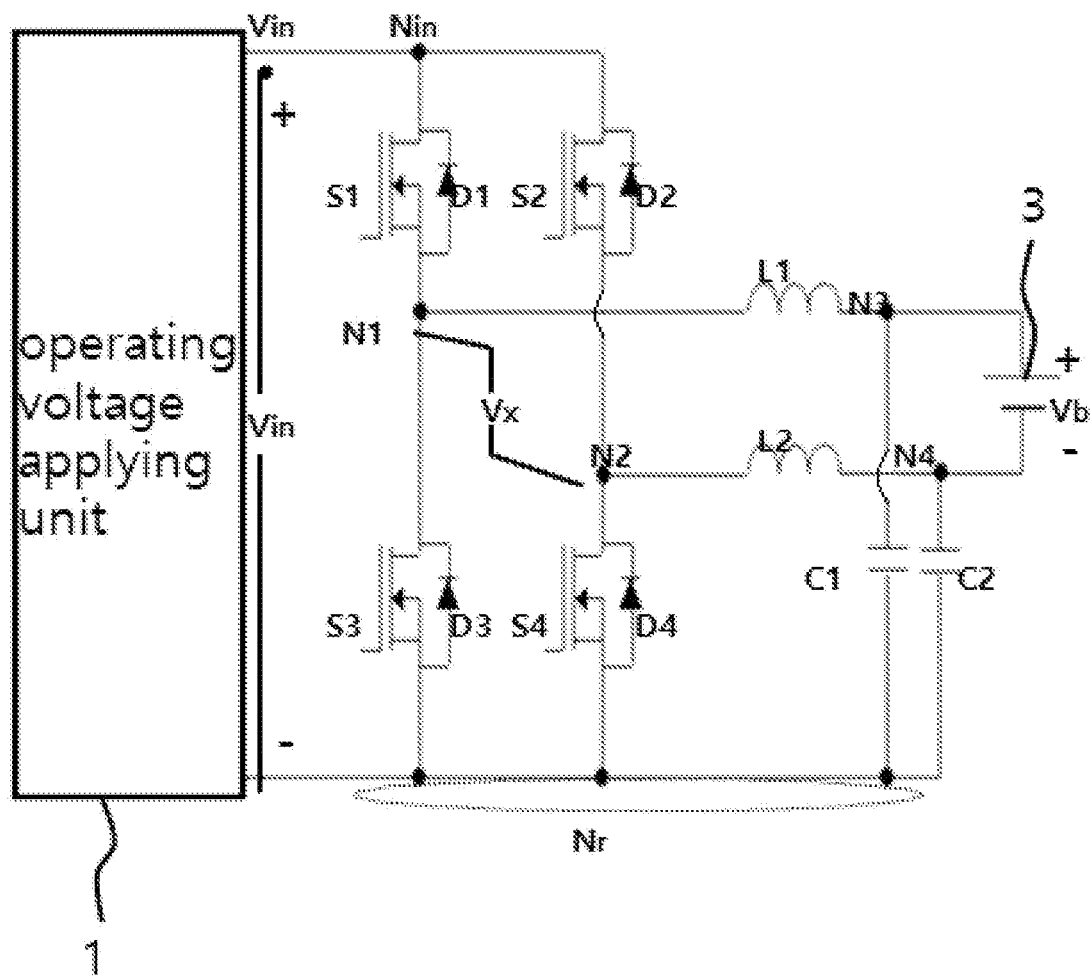
FIG. 1 is a configuration diagram of a zero-voltage discharge circuit device according to an embodiment of the disclosure.

FIG. 1 is a configuration diagram of a zero-voltage discharge circuit device according to an embodiment of the disclosure.

As shown in FIG. 1, the zero-voltage discharge circuit device according to an embodiment of the disclosure includes an operating voltage applying unit 1, and the operating voltage applying unit 1 generates and applies an operating voltage $V_{in}$ to an operating voltage applying node $N_{in}$. In other words, the operating voltage applying unit 1 operates to apply the operating voltage $V_{in}$ corresponding to a positive voltage to the operating voltage applying node $N_{in}$.

Further, the zero-voltage discharge circuit device according to an embodiment of the disclosure includes four switching elements, i.e., a first switching element S1, a second switching element S2, a third switching element S3, and a fourth switching element S4; two inductors, i.e., a first inductor L1 and a second inductor L2; and two capacitors, i.e., a first capacitor C1 and a second capacitor C2 in order to perform an operation of charging a secondary battery 3 and an operation of discharging the secondary battery 3

The first switching element S1 has a first end connected to the operating voltage applying node $N_{in}$ corresponding to the node to which the operating voltage applying unit 1 applies the operating voltage $V_{in}$, and a second end connected to a first node N1.

The first switching element S1 is made of a metal oxide semiconductor field effect transistor (MOSFET). Specifically, the first switching element S1 is disposed with a drain connected to the operating voltage applying node $N_{in}$, and a source connected to the first node N1.

A first diode D1 is connected to the first switching element S1 made of the MOSFET. The first diode D1 is connected to prevent the first switching element S1 made of the MOSFET from being damaged by high counter electromotive force applied to the drain at the moment when the first switching element S1 is turned off from an on state. The first diode D1 is disposed with an anode connected to the first node N1, and a cathode connected to the operating voltage applying node $N_{in}$.

The second switching element S2 has a first end connected to the operating voltage applying node $N_{in}$, and a second end connected to a second node N2, and is connected in parallel with the first switching element S1.

Like the first switching element S1, the second switching element S2 is also made of a MOSFET. Specifically, the second switching element S2 is disposed with a drain connected to the operating voltage applying node $N_{in}$, and a source connected to the second node N2.

A second diode D2 is connected to the second switching element S2 made of the MOSFET. The second diode D2 is connected to prevent the second switching element S2 made of the MOSFET from being damaged by high counter electromotive force applied to the drain at the moment when the second switching element S2 is turned off from an on state. The second diode D2 is disposed with an anode connected to the second node N2, and a cathode connected to the operating voltage applying node $N_{in}$.

The third switching element S3 has a first end connected to the first node N1, and a second end connected to a reference node $N_r$. Here, the reference node $N_r$ may be connected to the ground.

Like the first switching element S1, the third switching element S3 is also made of a MOSFET. Specifically, the third switching element S3 is disposed with a drain connected to the first node N1, and a source connected to the reference node $N_r$.

A third diode D3 is connected to the third switching element S3 made of the MOSFET. The third diode D3 is connected to prevent the third switching element S3 from being damaged by high counter electromotive force applied to the drain at the moment when the third switching element S3 is turned off from an on state. The third diode D3 is disposed with an anode connected to the reference node $N_r$, and a cathode connected to the first node N1.

The fourth switching element S4 has a first end connected to the second node N2, and a second end connected to the reference node $N_r$. Here, the reference node $N_r$ may be connected to the ground.

Like the first switching element S1, the fourth switching element S4 is also made of a MOSFET. Specifically, the fourth switching element S4 is disposed with a drain connected to the second node N2, and a source connected to the reference node $N_r$.

A fourth diode D4 is connected to the fourth switching element S4 made of the MOSFET. The fourth diode D4 is connected to prevent the fourth switching element S4 made of the MOSFET from being damaged by high counter electromotive force applied to the drain at the moment when the fourth switching element S4 is turned off from an on state. The fourth diode D4 is disposed with an anode connected to the reference node $N_r$, and a cathode connected to the second node N2.

The first inductor L1 has a first end connected to the first node N1, and a second end connected to a third node N3 to which a positive (+) terminal of the secondary battery 3 is connected. Specifically, the first inductor L1 has the first end connected to the source of the first switching element S1 and the drain of the third switching element S3 via the first node N1, and the second end connected to the positive (+) terminal of the secondary battery 3 via the third node N3.

The first inductor L1 is made of a current stabilizing coil, and operates so that a charging current and a discharging current can flow stably. In particular, the first inductor L1 is directly involved in making the charging current stably flow in the secondary battery 3 in the charge mode for charging the secondary battery 3, as will be described later.

The first capacitor C1 has a first end connected to the third node N3, and a second end connected to the reference node $N_r$. Specifically, the first capacitor C1 has the first end connected to the second end of the first inductor L1 and the positive (+) terminal of the secondary battery 3 via the third node N3, and the second end connected to the source of the third switching element S3 and the source of the fourth switching element S4 via the reference node $N_r$.

The first capacitor C1 operates as a voltage stabilizing capacitor to stabilize a voltage waveform of the secondary battery in the charge and discharge modes for the secondary battery 3. In particular, the first capacitor C1 is connected in parallel with the secondary battery 3 in the charge mode for charging the secondary battery 3, and is directly involved in stabilizing the voltage waveform of the secondary battery, as will be described later.

The second inductor L2 has a second end connected to the second node N2, and a first end connected to a third node N4 to which a negative (−) terminal of the secondary battery 3 is connected. Specifically, the second inductor L2 has the second end connected to the source of the second switching element S2 and the drain of the fourth switching element S4 via the second node N2, and the first end connected to the negative (+) terminal of the secondary battery 3 via the fourth node N4.

The second inductor L2 is made of a current stabilizing coil, and operates so that the charging current and the discharging current can flow stably. In particular, the second inductor L2 is directly involved in making the discharging current stably flow in the secondary battery 3 in the discharge mode for discharging the secondary battery 3, as will be described later.

The second capacitor C2 has a first end connected to the fourth node N4, and a second end connected to the reference node $N_r$. Specifically, the second capacitor C2 has the first end connected to the first end of the second inductor L2 and the negative (−) terminal of the secondary battery 3 via the fourth node N4, and the second end connected to the source of the third switching element S3, the source of the fourth switching element S4, and the second end of the first capacitor C1 via the reference node $N_r$.

The second capacitor C2 operates as a voltage stabilizing capacitor to stabilize a voltage waveform of the secondary battery in the charge and discharge modes for the secondary battery 3. In particular, the second capacitor C2 is connected in parallel with the secondary battery 3 in the discharge mode for discharging the secondary battery 3, and is directly involved in stabilizing the voltage waveform of the secondary battery, as will be described later.

Below, the operations of the zero-voltage discharge circuit device configured as described above according to an embodiment of the disclosure will be described with reference to the circuit diagrams of FIGS. 2 and 3, and the waveforms of FIG. 4.

The zero-voltage discharge circuit device according to an embodiment of the disclosure further includes a control unit 5 and a switching signal generation unit 7 to selectively control the switching of the switching elements S1, S2, S3, and S4 so that the operations of charging and discharging the secondary battery 3 can be performed.

Figure 5:
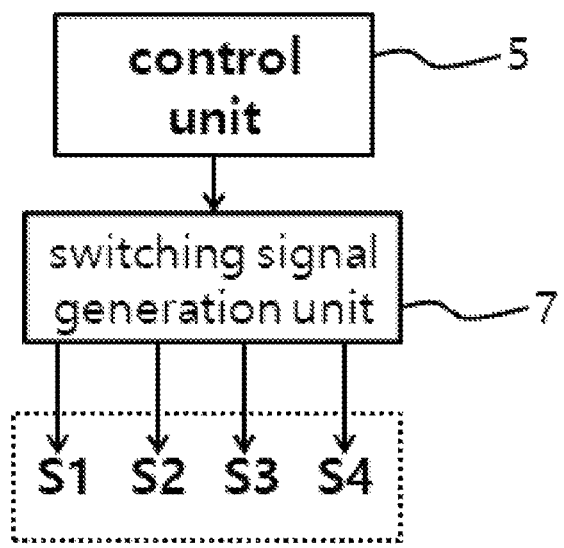
FIG. 5 is a control block diagram showing connection states of a switching signal generation unit and a control unit to switch on and off switching elements according to an embodiment of the disclosure.

As shown in FIG. 5, the control unit 5 is connected to the switching signal generation unit 7 so as to output control signals for switching on and off the switching elements S1, S2, S3, and S4. The switching signal generation unit 7 is connected to each gate of the switching elements S1, S2, S3, and S4 to output the switching signals for turning on and off the switching elements S1, S2, S3, and S4 of FIG. 1.

Figure 2:
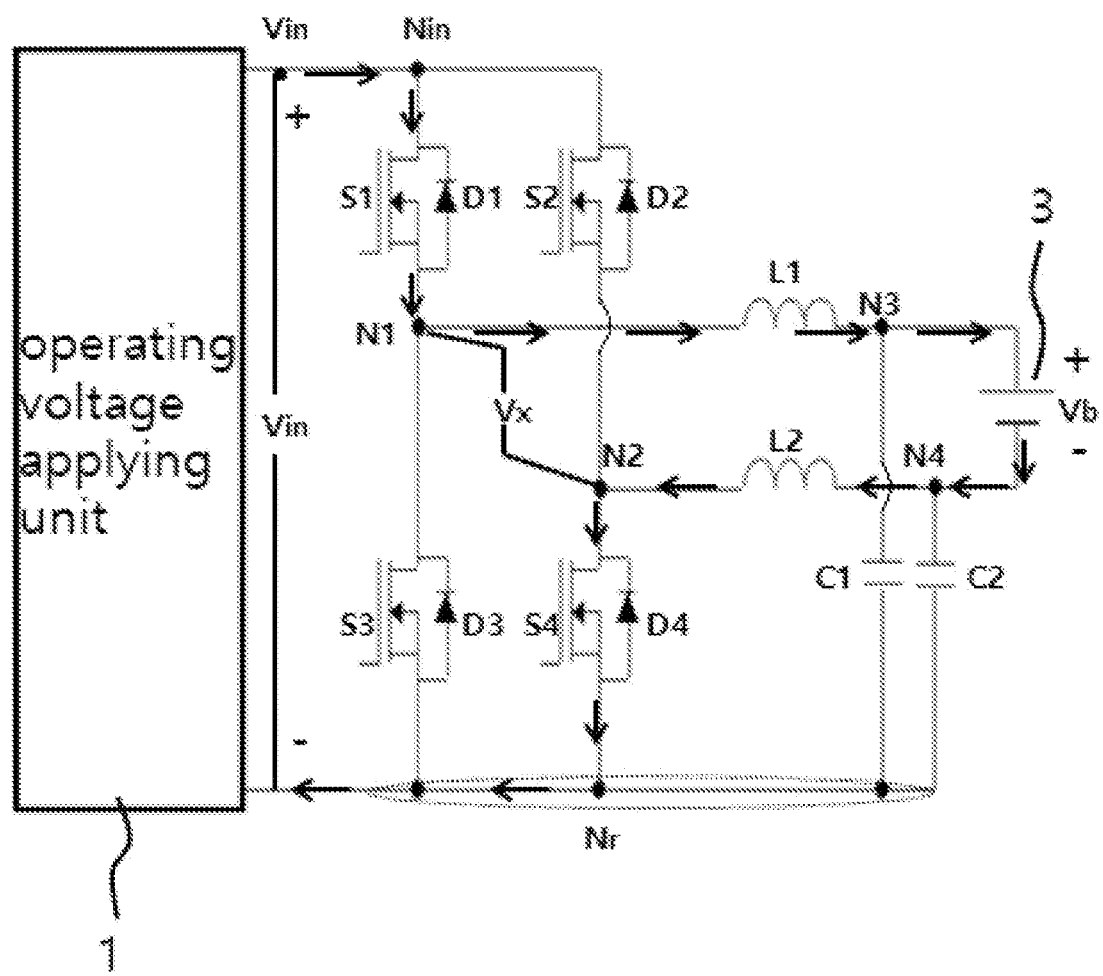
FIG. 2 is a circuit diagram of FIG. 1, showing current flows to explain operations in a charge mode of the zero-voltage discharge circuit device according to an embodiment of the disclosure.
Figure 3:
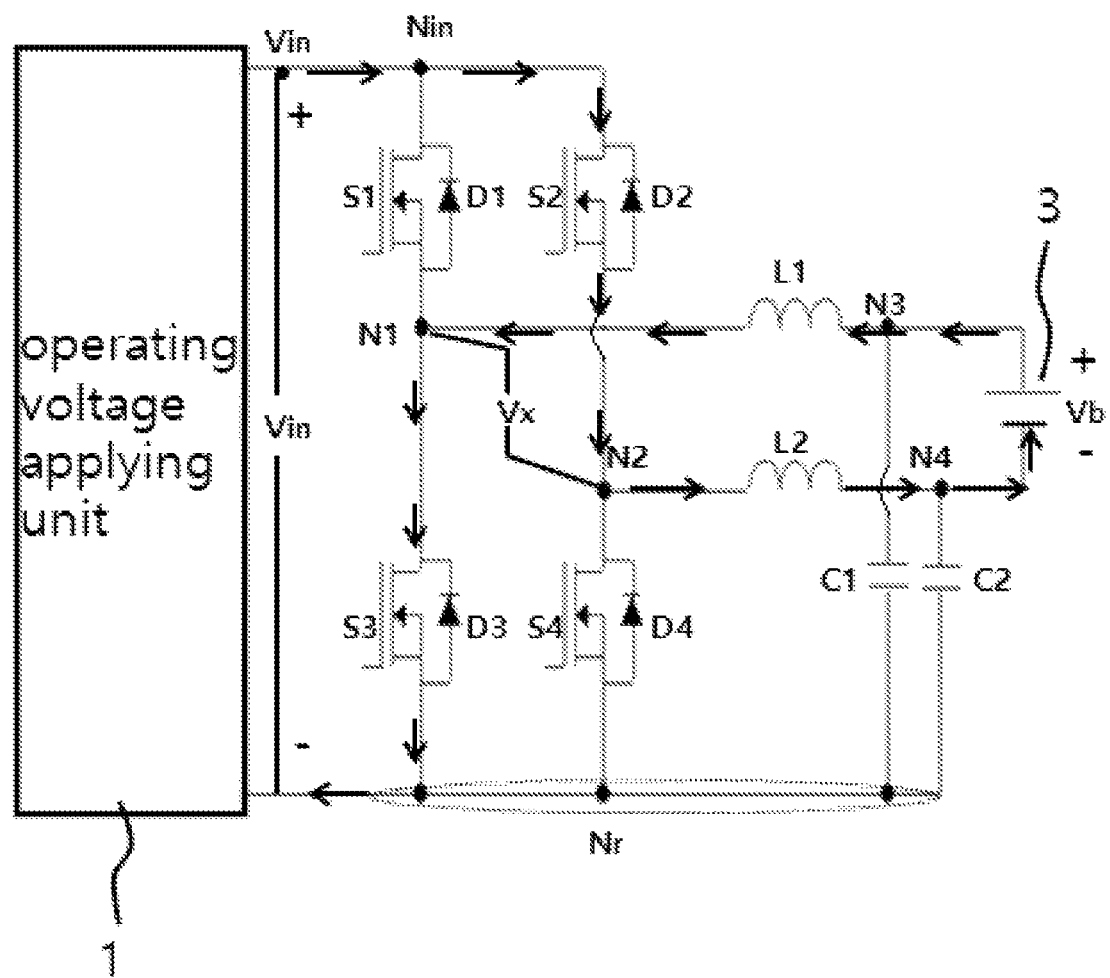
FIG. 3 is a circuit diagram of FIG. 1, showing current flows to explain operations in a discharge mode of a zero-voltage discharge circuit device according to an embodiment of the disclosure.
Figure 4:
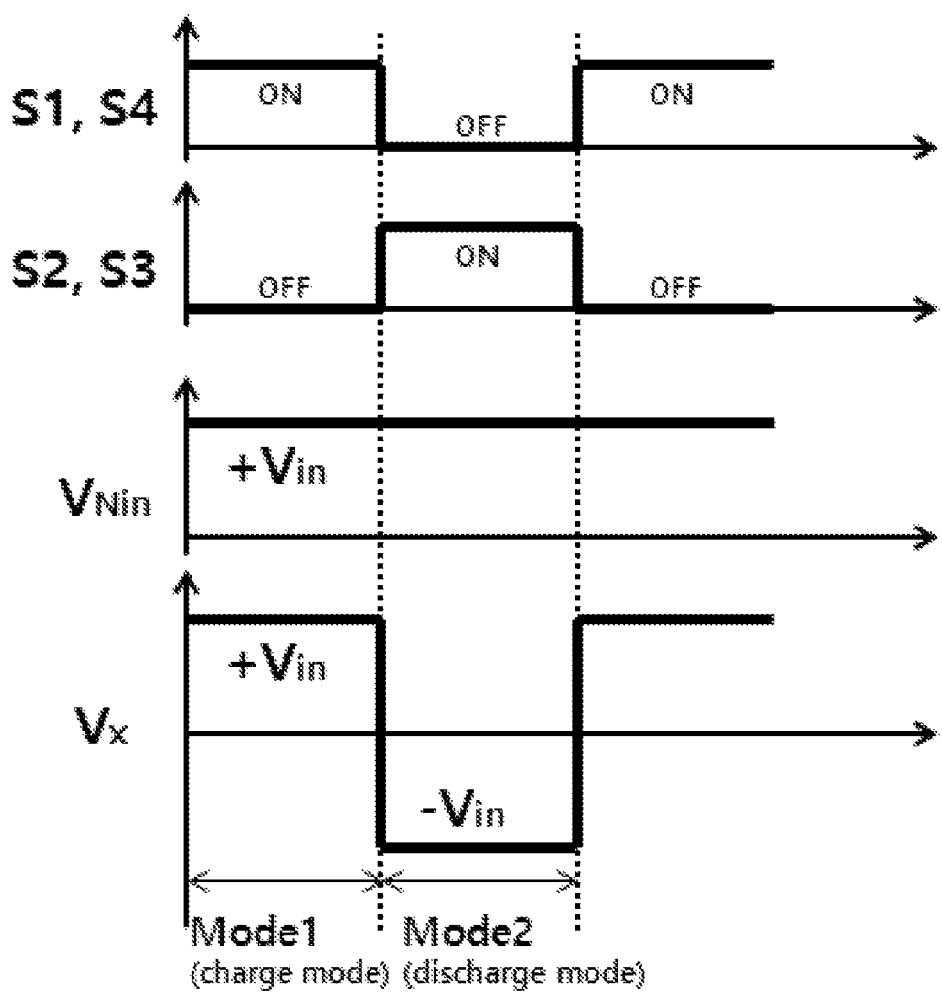
FIG. 4 shows waveforms of control signals for switching elements and voltages at relevant nodes in charging and discharging modes of a zero-voltage discharge circuit device according to an embodiment of the disclosure.

Specifically, referring to FIG. 4, the control unit 5 controls the switching signal generation unit 7 to turn on the first switching element S1 and the fourth switching element S4 but turn off the second switching element S2 and the third switching element S3 in the operation of the charge mode Mode 1 shown in FIG. 2, and controls the switching signal generation unit 7 to turn on the second switching element S2 and the third switching element S3 but turn off the first switching element S1 and the fourth switching element S4 in the operation of the discharge mode Mode 2 shown in FIG. 3.

In other words, the zero-voltage discharge circuit device according to an embodiment of the disclosure operates to turn on only the first switching element S1 and the fourth switching element S4 in the charge mode Mode 1 for the secondary battery 3, and turn on only the second switching element S2 and the third switching element S3 in the discharge mode Mode 2 for the secondary battery 3.

Referring to FIG. 2, the operations in the charge mode Mode 1 for charging the secondary battery 3 and the flow of the charging current are as follows.

The switching control signal corresponding to the charge mode Mode 1 of FIG. 4 is output from the control unit 5 to the switching signal generation unit 7 of FIG. 5. In other words, in the charge mode Mode 1 of FIG. 4, the switching signal generation unit 7 outputs a turning-on signal to the gates of the first switching element S1 and the fourth switching element S4, and at the same time outputs a turning-off signal to the second switching element S2 and the third switching element S3. Then, the first switching element S1 and the fourth switching element S4 are turned on, and at the same time the second switching element S2 and the third switching element S3 are turned off.

As described above, the applying voltage $V_{in}$ generated and applied by the operating voltage applying unit 1 is applied to the operating voltage applying node $N_{in}$ to which the first ends, i.e., the drains of the first switching element S1 and the second switching element S2 are connected together.

Then, as shown in FIG. 2, the charging current flows in a closed circuit formed by the operating voltage applying node $N_{in}$→the first switching element S1→the first node N1→the first inductor L1→the third node N3→the positive (+) terminal of the secondary battery 3→the negative (−) terminal of the secondary battery 3→the fourth node N4→the second inductor L2→the second node N2→the fourth switching element S4→the reference node $N_r$→the operating voltage applying unit 1.

As the operating voltage $V_{in}$ is applied to the first inductor L1, the first inductor L1 allows the charging current to stably flow to the positive (+) terminal of the secondary battery 3, and this flow of the charging current enables charging the secondary battery 3. Further, as the charging current flows along the second inductor L2 and the fourth switching element S4, the negative (−) terminal of the secondary battery 3 is connected to the reference node $N_r$ to which the second end of the first capacitor C1 is connected, and the positive (+) terminal of the secondary battery 3 and the first end of the first capacitor C1 are connected via the third node N3, so that the secondary battery 3 can be maintained as connected in parallel with the first capacitor C1, thereby charging the secondary battery 3 while a stable waveform is maintained by the first capacitor C1 operating as the voltage stabilizing capacitor.

Meanwhile, as described above, in the charge mode shown in FIG. 2, the operating voltage $V_{in}$ is applied to the operating voltage applying node $N_{in}$, and therefore, as shown in FIG. 4, the voltage $V_{Nin}$ at the operating voltage applying node $N_{in}$ is +$V_{in}$ and is continuously maintained at a constant level of +$V_{in}$ during the charge mode.

As the first switching element S1 is turned on, the voltage applied to the first node N1 becomes +$V_{in}$ corresponding to the operating voltage on the premise that the voltage drop in the first switching element S1 is "0". Further, as the fourth switching element S4 is turned on, the voltage applied to the second node N2 becomes "0", i.e., the ground voltage at the reference node $N_r$ on the premise that the voltage drop in the fourth switching element S4 is "0". Therefore, voltage between the first node N1 and the second node N2, specifically, voltage Vx at the first node N1 with respect to the second node N2 becomes +$V_{in}$ corresponding to the operating voltage as shown in FIG. 4.

Because the voltage Vx at the first node N1 with respect to the second node N2 becomes +$V_{in}$, the first inductor L1 allows the charging current to flow from the positive (+) terminal toward the negative (−) terminal of the secondary battery 3, thereby charging the secondary battery 3. Of course, the second inductor L2 is also helpful in flowing the charging current because the charging current flows along the closed circuit.

Referring to FIG. 3, the operations in the discharge mode Mode 2 for discharging the secondary battery 3 and the flow of the discharging current are as follows.

The switching control signal corresponding to the discharge mode Mode 2 of FIG. 4 is output from the control unit 5 to the switching signal generation unit 7 of FIG. 5. In other words, in the discharge mode Mode 2 of FIG. 4, the switching signal generation unit 7 outputs a turning-on signal to the gates of the second switching element S2 and the third switching element S3, and at the same time outputs a turning-off signal to the first switching element S1 and the fourth switching element S4. Then, the second switching element S2 and the third switching element S3 are turned on, and at the same time the first switching element S1 and the fourth switching element S4 are turned off.

As described above, the applying voltage $V_{in}$ generated and applied by the operating voltage applying unit 1 is applied to the operating voltage applying node $N_{in}$ to which the first ends, i.e., the drains of the first switching element S1 and the second switching element S2 are connected together.

Then, as shown in FIG. 2, the charging current flows in a closed circuit formed by the operating voltage applying node $N_{in}$→the second switching element S2→the second node N2→the second inductor L2→the fourth node (N4)→the negative (−) terminal of the secondary battery 3→the positive (+) terminal of the secondary battery 3→the third node N3→the first inductor L1→the first node N1→the third switching element S3→the reference node $N_r$→the operating voltage applying unit 1. Eventually, current (i.e., the discharging current) flows from the negative (−) terminal to the positive (+) terminal of the secondary battery 3, so that the secondary battery 3 can perform a discharge operation of discharging the charged voltage.

As the operating voltage $V_{in}$ is applied to the second inductor L2, the second inductor L2 allows the discharging current to stably flow to the negative (−) terminal of the secondary battery 3, and this flow of the discharging current enables discharging the voltage charged in the charge mode from the secondary battery 3. Further, as the discharging current flows along the first inductor L1 and the third switching element S3, the positive (+) terminal of the secondary battery 3 is connected to the reference node $N_r$ to which the second end of the second capacitor C2 is connected, and the negative (−) terminal of the secondary battery 3 and the first end of the second capacitor C2 are connected via the fourth node N4, so that the secondary battery 3 can be maintained as connected in parallel with the second capacitor C2, thereby discharging the secondary battery 3 while a stable waveform is maintained by the second capacitor C2 operating as the voltage stabilizing capacitor.

In such a discharge process, the second switching element S2 and the third switching element S3, which operate in the discharge mode, are continuously maintained as turned on without being turned on and off while the discharge circuit show in FIG. 3 operates in the discharge mode. As a result, the zero-voltage discharge circuit device according to the disclosure is configured to discharge the secondary battery 3 while the second switching element S2 and the third switching element S3 are kept continuously turned on without being repeatedly turned on and off in the discharge mode of the second battery 3, so that the discharge circuit can be configured with low withstand voltage switching elements, thereby reducing the costs of configuring the charging/discharging circuit.

Meanwhile, as described above, in the discharge mode shown in FIG. 3, the operating voltage $V_{in}$ is applied to the operating voltage applying node $N_{in}$ like that in the charging mode of FIG. 2, and therefore, as shown in FIG. 4, the voltage $V_{Nin}$ at the operating voltage applying node $N_{in}$ is +$V_{in}$ and is continuously maintained at a constant level of +$V_{in}$ during the discharge mode.

In other words, the operating voltage applying unit 1 applies the same operating voltage $V_{in}$ to the operating voltage applying node $N_{in}$ in the charge mode Mode 1 and the discharge mode Mode 2 of the secondary battery 3. Thus, the zero-voltage discharge circuit device according to the disclosure does not change the operating voltage in the charge mode and the discharge mode. In this way, the operating voltage $V_{in}$ for each mode is not varied but constantly applied by the operating voltage applying unit 1 when the zero-voltage discharge circuit device according to the disclosure switches over between the charge mode and the discharge mode. According to the disclosure, the charge mode and the discharge mode are switched over therebetween by just selectively turning on the switching elements without changing the operating voltage $V_{in}$. In other words, according to the disclosure, the switching elements are just selectively turned on without changing the operating voltage $V_{in}$ to generate the charging current and the discharging current, thereby having effects on reducing the power loss in the charging and the discharging, and simplifying a control operation for the charging and the discharging.

As the second switching element S2 is turned on, the voltage applied to the second node N2 becomes $+V_{in}$ corresponding to the operating voltage on the premise that the voltage drop in the second switching element S2 is "0". Further, as the third switching element S3 is turned on, the voltage applied to the first node N1 becomes "O", i.e., the ground voltage at the reference node $N_r$, on the premise that the voltage drop in the third switching element S3 is "0". Therefore, voltage between the first node N1 and the second node N2, specifically, voltage Vx at the first node N1 with respect to the second node N2 becomes $-V_{in}$ corresponding to the negative operating voltage as shown in FIG. 4.

Because the voltage Vx at the first node N1 with respect to the second node N2 becomes $-V_{in}$, the second inductor L2 allows the charging current to flow from the negative (−) terminal toward the positive (+) terminal of the secondary battery 3, thereby discharging the voltage charged in the charge mode from the secondary battery 3. Of course, the first inductor L1 is also helpful in flowing the discharging current because the discharging current flows along the closed circuit.

As described above, the discharging current flows in the operating voltage applying unit 1, thereby causing the voltage of the secondary battery 3 to be discharged. Meanwhile, in this discharging process, the voltage of the secondary battery 3 is not enough to achieve the discharging up to 0 V. To this end, the zero-voltage discharge circuit device according to the disclosure applies the same operating voltage as that for the charge mode to the operating voltage applying node in the discharge mode, and, as a result, the operating voltage is induced in the second inductor L2 by turning on the second switching element S2. The operating voltage induced in the second inductor L2 serves as auxiliary power in the discharge mode, so that the discharging current of the secondary battery 3 can be maintained even in a region where the voltage of the secondary battery 3 is low. Therefore, the secondary battery is sufficiently discharged up to 0 V.

Although a few embodiments of the disclosure have been described above, it will be apparent for a person having ordinary knowledge in the art that these descriptions are for the illustrative purposes only and various changes can be made without departing from the scope of the disclosure. Accordingly, the genuine technical scope of the disclosure should be defined by the appended claims.

INDUSTRIAL APPLICABILITY

A zero-voltage discharge circuit device according to the disclosure is configured to discharge a secondary battery while relevant switching elements are kept continuously turned on without being repeatedly turned on and off in a discharge mode of the second battery, so that the discharge circuit can be configured with low withstand voltage switching elements, thereby having industrial applicability of reducing costs of configuring a charging/discharging circuit.

The invention claimed is:
1. A zero-voltage discharge circuit device comprising:
a first switching element comprising a first end connected to an operating voltage applying node corresponding to a node to which an operating voltage is applied by an operating voltage applying unit, and a second end connected to a first node;
a second switching element comprising a first end connected to the operating voltage applying node, and a second end connected to a second node, and being connected in parallel with the first switching element;
a third switching element comprising a first end connected to the first node, and a second end connected to a reference node;
a fourth switching element comprising a first end connected to the second node, and a second end connected to the reference node;
a first inductor comprising a first end connected to the first node, and a second end connected to a third node to which a positive (+) terminal of a secondary battery is connected;
a first capacitor comprising a first end connected to the third node, and a second end connected to the reference node;
a second inductor comprising a second end connected to the second node, and a first end connected to a fourth node to which a negative (−) terminal of a secondary battery is connected; and
a second capacitor comprising a first end connected to the fourth node, and a second end connected to the reference node,
wherein
in a charge mode for the secondary battery, the operating voltage applying unit continuously applies the same operating voltage to the operating voltage applying node, only the first switching element and the fourth switching element are turned on while the second switching element and the third switching element are turned off, and a charging current flows in a first closed circuit from the operating voltage applying node through the first switching element, the first node, the first inductor, the third node, the secondary battery which is from a positive terminal to a negative terminal of the secondary battery, the fourth node, the second inductor, the second node, and the fourth switching element to the reference node, thereby returning to the operating voltage applying unit, such that the first inductor allows the charging current to stably flow to the positive terminal of the secondary battery while the secondary battery remains connected in parallel with the first capacitor, and
in a discharge mode for the secondary battery, the operating voltage applying unit continuously applies the same operating voltage to the operating voltage applying node, only the second switching element and the third switching element are turned on while the first switching element and the fourth switching element are turned off, the second switching element and the third switching element remain continuously turned on without being repeatedly turned on and off during the discharge mode, and a discharging current flows in a second closed circuit from the operating voltage applying node through the second switching element, the second node, the second inductor, the fourth node, the secondary battery which is from a negative terminal to a positive terminal of the secondary battery, the third node, the first inductor, the first node, and the third switching element to the reference node, thereby returning to the operating voltage applying unit such that the second inductor allows the discharging current to stably flow to the negative terminal of the secondary battery while the secondary battery remains connected in parallel with the second capacitor.

\* \* \* \* \*